No. 802,801. PATENTED OCT. 24, 1905.
T. C. DUNLAP.
VALVE FOR FLUID MOTORS.
APPLICATION FILED JULY 25, 1904.
3 SHEETS—SHEET 3.
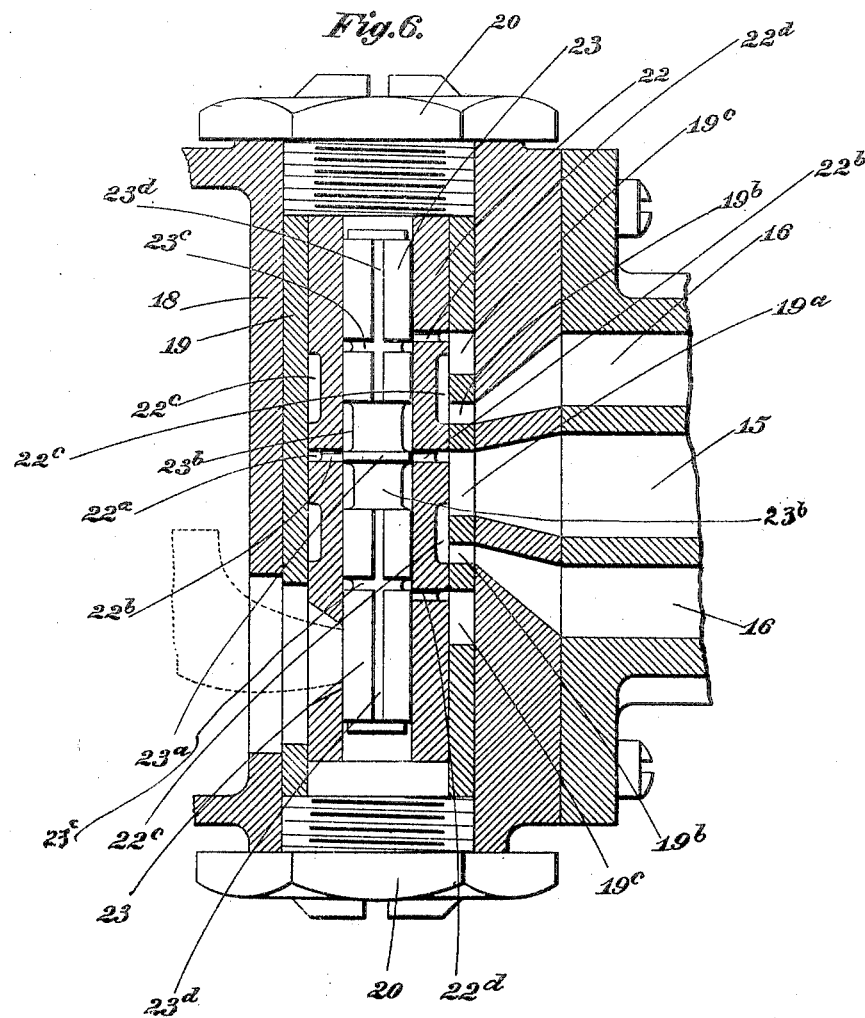
Witnesses
Benj. Finckel
M. C. Gaskill
Inventor
Thaddeus C. Dunlap
by Finckel & Finckel
his Attorneys

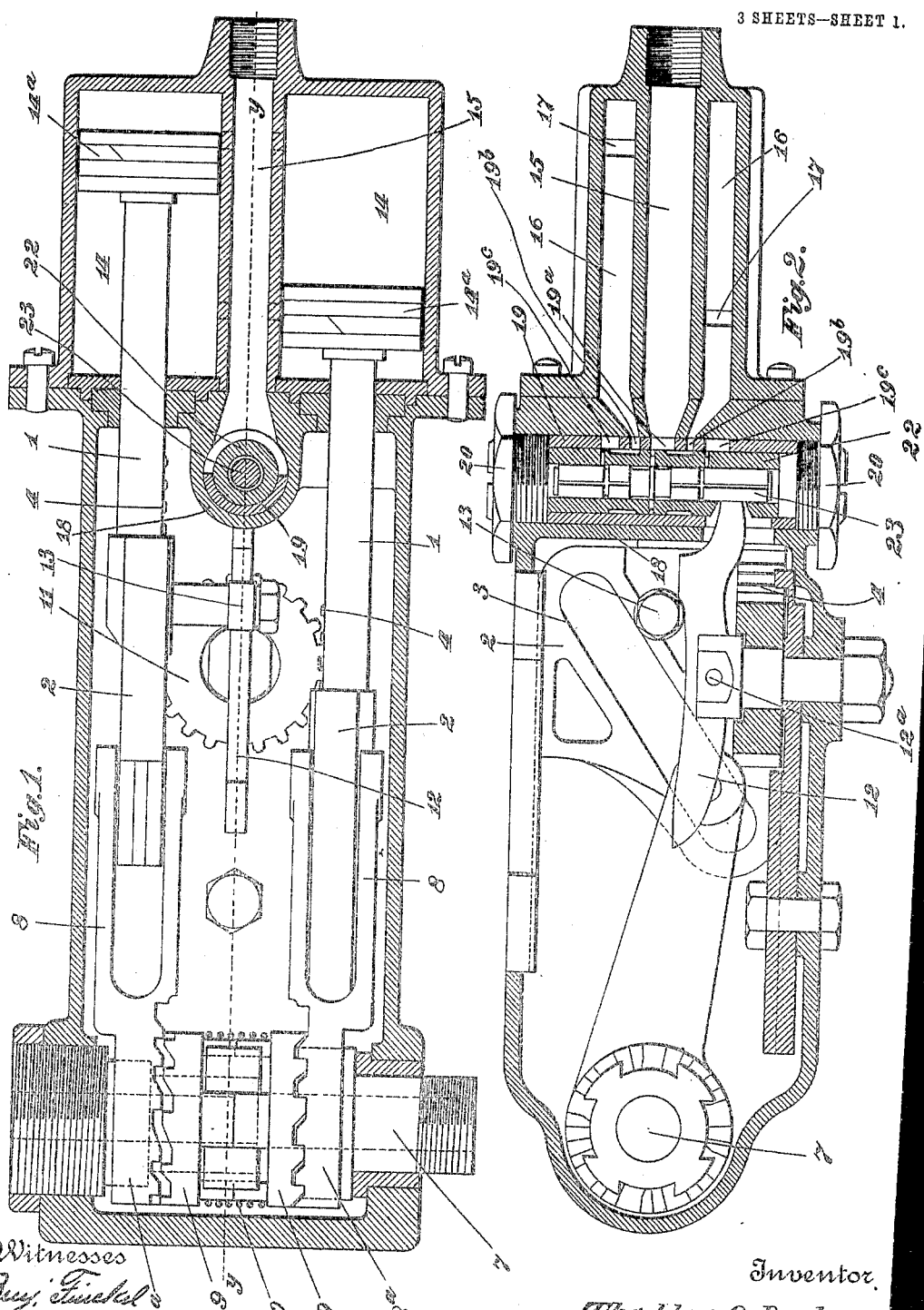

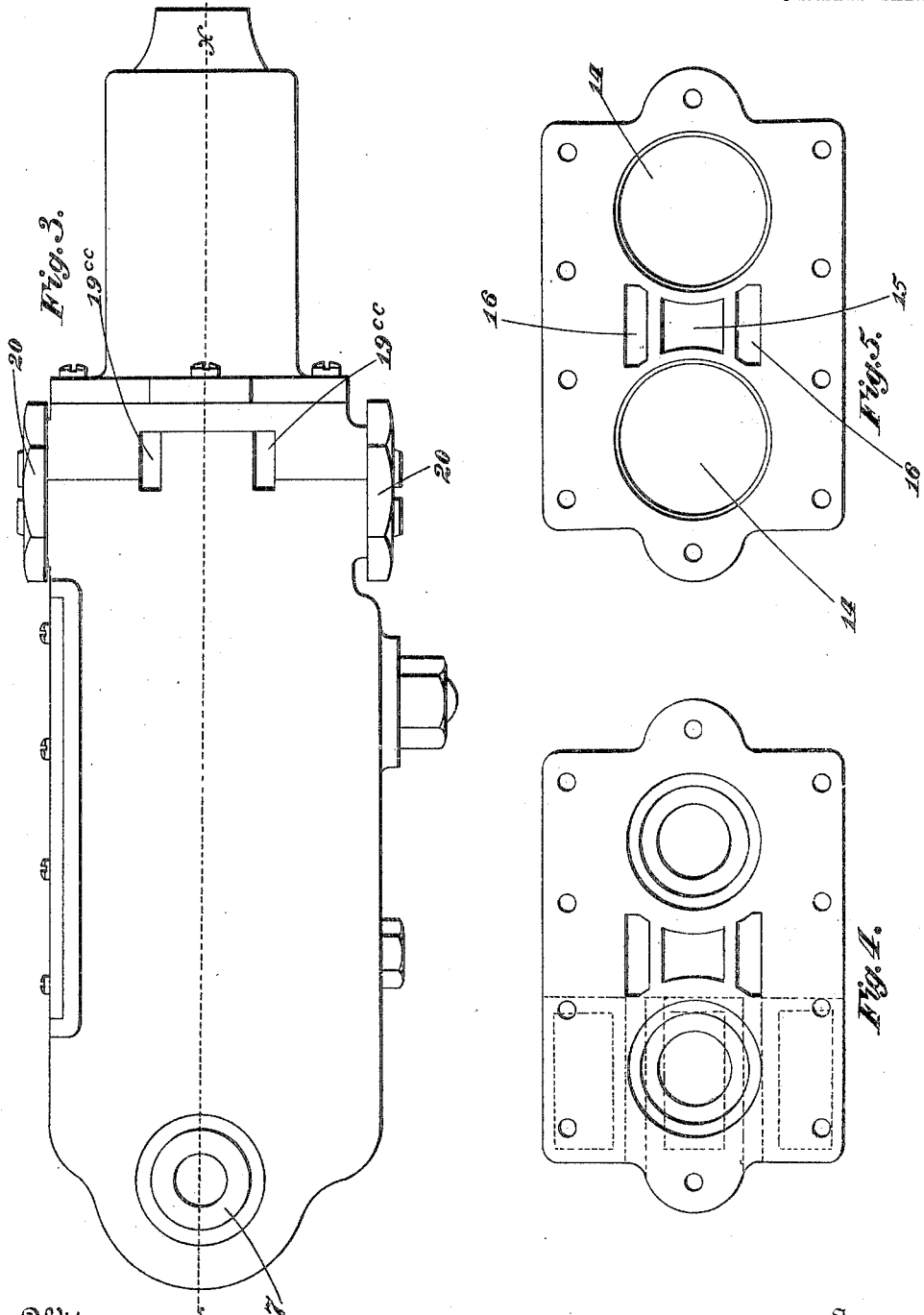

UNITED STATES PATENT OFFICE.

THADDEUS C. DUNLAP, OF COLUMBUS, OHIO.

VALVE FOR FLUID-MOTORS.

No. 802,801.      Specification of Letters Patent.      Patented Oct. 24, 1905.

Application filed July 25, 1904. Serial No. 218,050.

*To all whom it may concern:*

Be it known that I, THADDEUS C. DUNLAP, a citizen of the United States, residing at Columbus, in the county of Franklin and State of Ohio, have invented certain new and useful Improvements in Valves for Fluid-Motors; and I do hereby declare the following to be a full, clear, and exact description of the invention, such as will enable others skilled in the art to which it appertains to make and use the same.

This invention relates to a motor mechanism of the kind shown in the United States Letters Patent issued to Ulrich and Wittke February 5, 1901, No. 667,350. Where a valve for controlling the ports to the cylinders is directly operated, as by the tappet lever or shifter 12 in said patent, great accuracy in the construction and fitting of the parts is necessary. To overcome the necessity for such nicety in construction and fitting of parts and to secure greater certainty in operation, I propose to provide in such mechanism an auxiliary valve to be operated mechanically to effect a pneumatic operation of the main valve.

The invention consists in the construction hereinafter described and claimed.

In the accompanying drawings, Figure 1 is a longitudinal sectional view taken on the plane $x\,x$, Fig. 3, some parts being in full. Fig. 2 is a sectional view on the plane $y\,y$, Fig. 1, some parts being in full. Fig. 3 is a side view of the exterior. Fig. 4 is an end view of the frame with the cylinder - section removed. Fig. 5 is an end view of the cylinder-section. Fig. 6 is a sectional view on a magnified scale of the main and auxiliary valves.

As in the former patent herein referred to, the present mechanism has cross-heads 2 2, with inclined ways 3 3 and toothed rack portions 4 4, a shaft 7 for the tool, symmetrically-toothed heads $8^a$ on arms 8 rocked by the cross-heads, clutches 9 sliding on the shaft 7 and spring 10 for pressing the clutches into the heads $8^a$, a toothed wheel 11 between the racks 4 4 to equalize the operation of the arms 8, and a tappet or shifting lever 12, fulcrumed at $12^a$ to be intermittently rocked by a pin 13 on one of the reciprocating cross-heads 2. In the present invention, however, I show the cylinders 14 14 with pistons $14^a\,14^a$, having appropriate rods 1 connected with the cross-heads 2 2 for reciprocating them. 15 designates the inlet for the motor fluid—for example, air—and 16 16 passages, with appropriate ports 17 connecting said passages and the ends of the cylinders. Within the main frame, near its junction with the cylinder-section, is cast a casing 18, in which is fitted a cylindrical bushing 19, held in position by threaded caps 20, thus forming a valve-chamber. The bushing has an opening $19^a$ in the middle of one side coinciding with the inlet 15, and openings $19^b$ coinciding with the passages 16 16, and openings $19^c$, that communicate with the exhaust-ports $19^{cc}$. (See Fig. 3.) Sliding within the bushing is the main valve 22, having a narrow central annular groove $22^a$, with through-ports $22^b$, and beyond this on either side a wide annular groove $22^c$, adapted to connect the inlet 15 with one of the passages 16 and the other passage 16 with an exhaust $19^c$ and $19^{cc}$. Said main valve also has, at each end beyond the exhaust, ports or openings $22^d$ coinciding with the exhaust-passages $19^c$ and $19^{cc}$.

Fitting and sliding within the main valve is the auxiliary valve 23, having at its middle a ridge $23^a$, at each side of which are wide annular grooves $23^b$ and at each end narrow annular grooves $23^c$. The grooves $23^b$ and $23^c$ are connected by longitudinal grooves $23^d$, extending to the ends of the auxiliary valve. The grooves $23^b$ are so located with respect to the ridge $23^a$ that when that ridge closes the ports $22^b$ the grooves $23^c$ are also closed, but when the ridge is just off said ports $22^b$ at one side the groove $23^c$ at the corresponding side coincides with the exhaust-opening $22^d$ at that side.

The casing 18 and bushing 19 are made with coinciding openings, through which an end of the tappet or shifting lever 12 passes into a socket or hole in the auxiliary valve into engagement with the valve. The openings in the casing 18 and bushing 19 are made large enough to permit the end of the shifting-lever 12 to throw the auxiliary valve independently of the main valve to such an extent as to move the ridge $23^a$ beyond the ports $22^b$ in either direction and the proper groove $23^c$ into coincidence with the proper port $22^d$.

The operation therefore is as follows: Referring to Figs. 1 and 2 and 6 and assuming that the parts are in the position seen in those views and that the cross-head in the upper part of Fig. 1 is moving inward, the auxiliary valve will be shifted downward by the tappet, so as to take the ridge $23^a$ off the port $22^b$ and bring the groove $23^c$ opposite the port $22^d$. This will let pressure in the inlet 15 into the upper portion of the valve-chamber, thereby forcing the main valve down, the air in the lower part of said chamber exhausting through the lower groove $23^c$, port $22^d$, and port $19^c$ and $19^{cc}$. When the main valve is thus thrown, the lower wide groove $22^c$ is brought to coincide both with the passage $19^b$ and the exhaust $19^c$, and the upper wide groove $22^c$ is brought to coincide both with the inlet 15 and the upper passage 16. The pressure is thus admitted to one end of each cylinder and exhausted from the other, as will be readily understood by those versed in the art to which this invention appertains. The up-stroke of the operative end of the tappet effects the same result, except that the direction of the pressure on the valve and the pistons is reversed, as will be readily understood.

With this invention it will be observed that the operation of the main valve will be prompt and positive. In order to admit the proper quantity of air and at the same time be capable of sustaining the strain of operation at a high speed, the main valve should be of considerable size and weight. By the construction proposed the tappet or shifter is relieved of the strain of working the main valve and the burden put upon the operating fluid. The main valve can therefore be of ample size and weight.

Another important advantage of the present construction is that the movement of the main or controlling valve is independent of the piston speed, giving an instantaneous and full opening of the ports whether the speed of the piston be slow or fast.

What I claim, and desire to secure by Letters Patent, is—

In a fluid-pressure motor, the combination with the ports of the supply, exhaust and working passages thereof, of a main tubular valve for controlling said ports having the through-passages $22^b$ and $22^d$ and the external annular wide grooves $22^c$, a solid auxiliary valve for controlling the operation of the said main valve having the central annular ridge $23^a$, the wide annular grooves $23^b$, the narrow annular grooves $23^c$ and the longitudinal grooves $23^d$ crossing the grooves $23^c$ and affording passages from the wide grooves $23^b$ to the ends of the auxiliary and main valves, and a vibrating arm 12 reaching laterally through the main valve and into the auxiliary valve for operating the same, substantially as described.

In testimony whereof I affix my signature in presence of two witnesses.

THADDEUS C. DUNLAP.

Witnesses:
 BENJ. FINCKEL,
 SAMUEL W. LATHAM.